(12) United States Patent
Herbeck et al.

(10) Patent No.: US 8,343,410 B2
(45) Date of Patent: Jan. 1, 2013

(54) INDUCTION-ASSISTED PRODUCTION METHOD

(75) Inventors: Lars Herbeck, Veltheim (DE); Thorsten Mahrholz, Salzgitter (DE); Tobias Stroehlein, Braunschweig (DE); Juergen Mosch, Braunschweig (DE); Michael Frauenhofer, Braunschweig (DE); Stefan Boehm, Schwuelper (DE); Klaus Dilger, Braunschweig (DE); Harald Haeger, Luedinghausen-Seppenrade (DE); Christian Baron, Haltern am See (DE); Markus Pridoehl, Grosskrotzenburg (DE)

(73) Assignee: Evonik Degussa GmbH, Essen (DE)

( * ) Notice: Subject to any disclaimer, the term of this patent is extended or adjusted under 35 U.S.C. 154(b) by 0 days.

(21) Appl. No.: 12/545,288

(22) Filed: Aug. 21, 2009

(65) Prior Publication Data

US 2009/0311506 A1 Dec. 17, 2009

Related U.S. Application Data

(63) Continuation of application No. PCT/EP2008/001464, filed on Feb. 25, 2008.

(51) Int. Cl.
*B32B 27/04* (2006.01)
*H05B 6/00* (2006.01)

(52) U.S. Cl. ..................... 264/427; 428/297.4
(58) Field of Classification Search .......................... None
See application file for complete search history.

(56) References Cited

U.S. PATENT DOCUMENTS

| 3,960,629 A | 6/1976 | Goldsworthy | 156/180 |
| 4,179,595 A | 12/1979 | Chiron | 219/10.5 |
| 5,248,864 A * | 9/1993 | Kodokian | 219/634 |
| 7,147,742 B2 | 12/2006 | Kirsten | 156/272.2 |
| 2004/0249037 A1 * | 12/2004 | Kolbe et al. | 524/401 |

FOREIGN PATENT DOCUMENTS

| AT | 350 680 | 6/1979 |
| DE | 26 03 540 | 8/1976 |
| DE | 38 80 716 T2 | 10/1993 |
| DE | 692 25 480 T2 | 12/1998 |
| DE | 10 2004 041 746 A1 | 3/2006 |
| EP | 0 281 347 B1 | 5/1993 |
| EP | 0 586 552 B1 | 11/1997 |
| EP | 0 596 996 B1 | 5/1998 |
| JP | 63-35334 | 2/1988 |
| WO | WO 02/12409 A1 | 2/2002 |
| WO | WO 2006/024413 A1 | 3/2006 |

* cited by examiner

*Primary Examiner* — Camie Thompson
(74) *Attorney, Agent, or Firm* — Oblon, Spivak, McClelland, Maier & Neustadt, L.L.P.

(57) ABSTRACT

A production method for producing molded articles from fiber composites, superparamagnetic particles are selected which become coupled to an external alternating magnetic field. These superparamagnetic particles are added to a resin portion of a strip-shaped starting material further comprising reinforcing fibers. The strip-shaped starting material is then continuously advanced, and, while being advanced, heated by coupling-in an external alternating magnetic field to which the superparamagnetic particles in the resin portion become coupled. Next, the heated starting material is continuously molded into a molded article; and the resin portion in the molded particle is cured.

35 Claims, 5 Drawing Sheets

INDUCTION-ASSISTED PRODUCTION METHOD

CROSS REFERENCE TO RELATED APPLICATIONS

This application is a continuation of International Patent Application PCT/EP2008/001464 entitled "Induction-assisted Production Method", filed on Feb. 25, 2008, and claiming priority to co-pending German Patent Application No. DE 10 2007 009 124.0 entitled "Induktionsgestutztes Fertigungsverfahren", filed Feb. 24, 2007.

FIELD OF THE INVENTION

The present invention generally relates to a production method for producing molded articles from fiber composites. More particularly, the present invention relates to a production method for producing molded articles from fiber composites, the method comprising the steps of continuously forwarding a strip-shaped starting material comprising reinforcing fibers and a thermoset or thermoplastic resin, and to a semifinished product for use as a starting material or obtained as an intermediate product in such a method.

The production method according to the invention and the semifinished product according to the invention may be based on thermoset or thermoplastic resins, which form the matrix of the finished molded articles made of fiber composites. In other words, the resin may become rigid in the molded articles chemically, in particular by crosslinking, and/or by solidifying as a result of lowering the temperature. The term "thermoplastic resin" is used here as synonymous with the terms "thermoplastic" and "thermoplastic polymer".

BACKGROUND OF THE INVENTION

A production method for producing molded articles from fiber composites, wherein a strip-shaped starting material comprising reinforcing fibers is continuously pushed or pulled forward, is known by the designation pultrusion and/or extrusion. In the case of this prior art, the starting material is typically prepared from dry reinforcing fibers, which are passed through a resin bath in order to impregnate them with resin. The starting material prepared in this way is then fed to a mold, in which it is molded and cured with respect to its resin component as it passes continuously through. The finished molded article leaves the mold in the form of an endless profile, which is then divided up into portions of the desired length. The forward-pulling force on the starting material is in this case applied in the region of the endless profile by a drawing tool. A variant of pultrusion is based on semifinished products known as prepregs as the starting material, which comprise reinforcing fibers and resin which, as it passes through, is at least preheated by a heating device before the prepregs enter the mold. Further heating of the resin for curing the same may take place in the mold. In the case of pultruders that are currently in use, the starting material is heated upstream of the mold by means of infrared radiation, a naked flame, hot air or hot inert gas. The heating in the mold takes place by way of the mold, which is for its art heated by heating cartridges, water or induction coils.

JP 63035334 A discloses heating the starting material in a forward region of a mold of a pultruder, in that a shaping inner core of the mold is heated by induction by means of an outer magnetic coil. In addition, heating of the rear part of the mold takes place by an electric heater. Therefore, the starting material is ultimately heated from the inside and the outside by contact with the mold.

The known methods of producing molded articles from fiber composites, wherein a strip-shaped starting material comprising reinforcing fibers and a thermoset or thermoplastic resin is continuously pushed or pulled forward, also include tape laying and tape winding. Basically the same techniques as those described above for heating upstream of the mold in the case of pultrusion have so far been used for heating the starting material. In addition, the starting material may be "ironed" onto the part of the molded article onto which it is laid or wound in this production method, being pressed against it with a hot tool.

All the methods of heating the starting material in the production of molded articles from fiber composites on the basis of strip-shaped starting materials described above entail the disadvantage that they do not allow quick, and nevertheless controlled, heating of the starting material to elevated temperatures, as are required for example for high-quality thermoplastic resins, such as PEEK, to form molded articles from these resins at a cost-effectively high rate. All these techniques require very high contact temperatures for heating at a high heating rate, and such temperatures directly entail the risk of damaging the starting material.

In a production method known from U.S. Pat. No. 3,960,629 an alternating magnetic field in the range from 60 Hz to 5 MHz, in particular from 1 kHz to 2 MHz, is coupled into the starting material, in which electrically conducting reinforcing fibers are present. The alternating magnetic field induces eddy currents in the electrically conducting reinforcing fibers, the electrical resistance of the reinforcing fibers having the effect that these currents lead to induction heating of the reinforcing fibers, and consequently of the starting material comprising the reinforcing fibers. However, it is found that the known production method requires very high frequencies of the alternating magnetic field in order to introduce the latter effectively into electrically conducting reinforcing fibers of a small diameter, unless eddy currents can be induced over a number of reinforcing fibers that are in electrical contact with one another. However, such eddy currents over a number of reinforcing fibers are scarcely realistic in the case of unidirectionally arranged reinforcing fibers such as those that are frequently used in the case of a pultrusion process. High frequencies of the alternating magnetic field, however, result in low depths of penetration of the alternating field into the starting material, so that it becomes difficult to heat the latter in volume. The production method known from DE 26 03 540 stipulates as a basic requirement that selection of the reinforcing fibers should take their electrical conduction properties into consideration, which greatly restricts the degrees of freedom in the selection of the reinforcing fibers in terms of achieving the otherwise desired properties of the molded articles produced.

It is known from U.S. Pat. No. 4,871,412 to bond thermoplastic layers that are reinforced by conducting fibers, such as for example carbon fibers, by introducing an alternating magnetic field into the fibers in order to induce electric currents in them. The electric currents are converted by the resistance of the conducting fibers into heat, which transfers itself to a resin component of the thermoplastic layers. The induction of the electric currents takes place only at a relatively high frequency of the alternating magnetic field above 1 MHz, and it requires that the unidirectionally running conducting fibers of a number of layers run in different directions, in order that eddy currents can flow over the fibers. However, in the case of the starting materials of the methods of the type described at the beginning, the reinforcing fibers are generally only present with unidirectional orientation in the direction of advancement of the starting material in a single layer. Moreover, heating of the resin over the reinforcing fibers likewise entails the disadvantage that the entire heat that is to be supplied to the resin must be transferred to the resin from outside, i.e. here from the conducting fibers. This limits the possible heating-up rate that is possible under controlled, non-damaging conditions.

A semifinished product known from U.S. Pat. No. 5,248,864 comprises electrically conducting reinforcing fibers, which however are specifically not intended to become coupled to an alternating magnetic field that is introduced. Rather, magnetic particles intended to serve as a preferential heating material when the alternating magnetic field is introduced are added to the resin of the semifinished product for this purpose. The magnetic particles may consist of a magnetic oxide. The magnetic particles are formed in such a way that the Curie point of the magnetic particles is not reached by the time the melting temperature or the curing temperature of the resin is reached, because it is assumed that no further significant heating occurs above the Curie point as a result of the alternating magnetic field introduced. The resin of the known semifinished product may be polyether ketone ketone (PEKK) or polyether ether ketone (PEEK), that is to say known high-temperature thermoplastics. Production methods in which a strip-shaped starting material comprising reinforcing fibers and resin is continuously pushed or pulled forward, or a corresponding strip-shaped starting material, are not mentioned here, or considered in any other way.

It is known in principle from U.S. Pat. No. 7,147,742 to add nanoscalar particles with ferromagnetic, ferrimagnetic, superparamagnetic or piezoelectric properties to an adhesive composition, so that, when an alternating magnetic field is introduced, the adhesive composition is heated in such a way that, in the case of thermoplastic adhesives, the softening point of the thermoplastic binder is reached or exceeded and, in the case of reactive adhesives, a temperature that brings about crosslinking of the binder matrix by way of the reactive groups of the binder is reached. The superparamagnetic particles are so-called "single-domain particles". In comparison with paramagnetic particles, these are distinguished by the fact that they have no hysteresis. This has the result that energy dissipation of the alternating magnetic field introduced is not induced by magnetic hysteresis losses, but instead the heat generation is attributable to an oscillation or rotation of the particles in the surrounding matrix that is induced during the time in which the alternating field is acting, and is consequently ultimately attributable to mechanical friction losses. This leads to a particularly effective heating rate of the particles and of the matrix surrounding them. U.S. Pat. No. 7,147,742 is not concerned with the production of molded articles from fiber composites, in particular not concerned with production methods in which a strip-shaped starting material comprising reinforcing fibers and resin is continuously pushed or pulled forward.

There still is a need of a production method for producing molded articles from fiber composites and of a semifinished product, that allow for a high production rate even when resins which must be heated to a high temperature are used, without involving the risk of thermal damage to the reinforcing fibers of the starting material.

SUMMARY OF THE INVENTION

The present invention relates to a production method for producing molded articles from fiber composites, the method comprising the steps of: selecting superparamagnetic particles from a group of superparamagnetic particles becoming coupled to an external alternating magnetic field; adding the selected superparamagnetic particles to a resin portion of a strip-shaped starting material comprising the resin portion and reinforcing fibers; continuously advancing the strip-shaped starting material; heating the continuously advanced strip-shaped starting material by coupling-in an external alternating magnetic field, to which the superparamagnetic particles in the resin portion of the starting material become coupled; continuously molding the heated starting material into a molded article; and curing the resin portion in the molded article.

In a more detailed aspect the present invention relates to a production method for producing molded articles from fiber composites, the method comprising the steps of: selecting superparamagnetic particles from a group of superparamagnetic particles which comprise primary particles of single magnetic metal-oxide domains having a diameter in a range from 2 to 100 nm embedded in a non-magnetic matrix, and which become coupled to an external alternating magnetic field; adding the selected superparamagnetic particles to a resin portion of a strip-shaped starting material comprising the resin portion and reinforcing fibers at a ratio in a range from 0.1 to 50% by weight of the resin portion, wherein the resin portion consists of a high-temperature thermoplastic; continuously advancing the strip-shaped starting material; heating the continuously advanced strip-shaped starting material by coupling-in an external alternating magnetic field at a frequency in a range from 10 kHz to 60 MHz, to which the superparamagnetic particles in the resin portion of the starting material become coupled; continuously molding the heated starting material into a molded article; and cooling the starting material molded into the molded article to solidify the resin portion in the molded article.

Further, the present invention provides a semifinished product for use in producing molded articles from fiber composites, the product being a strip which is elongate in a direction of main extention and comprising reinforcing fibers and a resin portion which includes superparamagnetic particles.

In case of the novel production methods, the starting material, as it rapidly passes through, is heated by coupling-in an alternating magnetic field into the resin. This makes very quick, but at the same time controlled and uniform, heating of the resin possible, so that the latter is molded into the molded article in an ideal state even with a high rate of advancement. This results in a high quality of the molded article when the resin in the molded article is cured. This applies in particular with respect to the production of molded articles from fiber composites using high-melting thermoplastic resins, for example those which melt above 250° C., such as polyether ether ketone (PEEK) or polyphenylene sulfide (PPS). The fact that, in the case of the novel production method, the alternating magnetic field is selectively introduced into the resin means that the reinforcing fibers are not subjected to any thermal stress, or only low thermal stress. When processing thermoplastic resin at a high rate, they can even be used deliberately as a heat buffer, in that, after the starting material has been molded into the desired molded article, they already use their thermal capacity to take up part of the heat from the resin that has to be removed from the resin to cure it. The resin then only reaches the maximum temperature to bond permanently with other layers or strips of the starting material in the molded article.

In order to achieve selective coupling of the resin of the starting material to the alternating magnetic field, added to the resin are superparamagnetic particles, which become coupled to the external alternating magnetic field with respect to the alignment of their internal magnetic field, without thereby involving the strict correlation between the diameter of the particles and the frequency of the alternating field as in the case of the classic heating by magnetic induction. The particles may therefore be very small, even without particularly increasing the frequency of the alternating magnetic field, preferably having a particle size of less than 500 nm. As a result, compared with their proportion by weight in the resin, the particles have a very large surface area for the heat transfer to the resin.

With particular preference, the superparamagnetic particles comprise primary particles from magnetic metal-oxide domains with a diameter of from 2 to 100 nm, i.e. a primary particle size of typically less than 50 nm; very small magnetic particles which generally have superparamagnetic properties. They provide the possibility of a particularly high heat transfer into the resin, and do so even into the range of relatively high temperatures of from 350 to 550° C., which is entirely adequate for melting even high-melting thermoplastic resins.

The primary particles in the superparamagnetic particles may be embedded in a non-magnetic metal-oxide or metalloid-oxide matrix, by which they are covered with a protective layer, for example of $SiO_2$ or some other inert compound, in order to be inert with respect to solvent, moisture and also reactive constituents of the resin. In addition, such and other protective layers may be provided to improve the compatibility of the particles with the resin, to make it easier for it to be able to disperse uniformly in the resin and, for example, also to prevent formation of aggregates from the particles.

In the case of such highly compatible superparamagnetic particles, relatively high proportions of magnetic particles of up to 50% by weight can also be added to the resin. However, only as many particles as are needed for the required heating of the resin must be added. In individual cases, even 0.1% by weight of superparamagnetic particles or only a little more may be adequate for this purpose.

In the case of the novel production method, it is entirely uncritical if the reinforcing fibers run unidirectionally in the running direction of the starting material, as is likewise the case with customary methods of producing according to the preamble of patent claim 1. On the contrary, even when using reinforcing fibers of electrically conductive material, such as for example carbon fibers, this ensures that there is no relevant introduction of the alternating magnetic field into the reinforcing fibers, and consequently also no relevant heating up of the reinforcing fibers by induced eddy currents.

In the case of the novel production method, the alternating magnetic field may be introduced into the resin with a frequency of from 10 kHz to 60 MHz, typically with a frequency of from 100 kHz to 10 MHz and preferably with a frequency of from 100 kHz to 1 MHz. It goes without saying that the frequency must be optimized in such a way as to achieve a maximum effect with respect to the uniform heating of the resin with minimal expenditure.

In the case of the novel production method, the starting material molded into the molded article is preferably cooled. This applies in particular to the case where a starting material with a thermoplastic resin is used, which is entirely preferred in the case of the novel production method. The cooling of the starting material in the molded article has the effect that the plasticity of the resin that is previously needed for the starting material to be molded into the molded article is eliminated again, in order to fix the composite produced by the molding of the starting material into the molded article.

As already mentioned, the thermoplastic resin may be a high-temperature thermoplastic, and in particular consist of a polyether ketone or polyphenylene sulfide.

Further thermoplastic resins and superparamagnetic particles that are suitable for the implementation of the present invention are disclosed in published US-Patent Application US 2008/292,824 A1 which is completely incorporated by reference.

In an actual embodiment, in the case of the novel production method the starting material may be molded into the molded article in a pultrusion process. In this case, the alternating magnetic field may be introduced into the starting material directly upstream of a mold, so that the starting material is heated before it enters the mold.

In another actual embodiment of the novel production method, the starting material is molded onto an already existing part of the molded article in a tape laying process. In this case, the alternating magnetic field may be introduced into the starting material in the region between guide rollers and a cooled pressing tool for the starting material. In the case of this novel tape laying process, the starting material is therefore already cooled again with the pressing tool, so that all of the already existing part of the molded article is at a relatively low temperature. This has the result that the already existing part of the molded article is dimensionally stable.

In the case of another embodiment of the novel production method, the starting material is wound onto an already existing part of the molded article in a winding process. In this case, theoretically a roving guide may move around the already existing part of the molded article. Typically, however, the already existing part of the molded article is rotated. The alternating magnetic field may in this case be introduced into the starting material in the region between the roving guide and a here likewise cooled pressing tool for the starting material.

An apparatus for producing molded articles from fiber composites with which the novel production method can be implemented comprises a heating device for introducing the alternating magnetic field into the resin of the starting material passing through.

To generate the alternating magnetic field, an alternating current generator, which generates an alternating current with a frequency of from 100 kHz to 1 MHz through an induction coil of the heating device, is preferably provided.

Apart from the heating device, the production apparatus preferably has a cooling device for cooling the starting material molded in the molded article.

The production apparatus may actually be a pultruder. In this case, the heating device may be provided upstream of a mold for the starting material.

The production apparatus may also be a tape layer, in which case the heating device may be provided in the region between guide rollers and a cooled pressing tool for the starting material.

In a further actual embodiment, the production apparatus is a tape winder. In this case, the heating device may be provided in the region between a roving guide and a cooled pressing tool for the starting material.

In all the embodiments of the novel production method, additional steps may be provided to form the starting material from initially dry reinforcing fibers and the respective resin, in which the reinforcing fibers pass for example through a bath which is filled with liquid resin. Conversely, the starting material may also be so-called prepregs, which are already impregnated with resin.

A semifinished product according to the invention that is intended for use as a starting material in the case of the production method according to the invention or can be obtained as an intermediate product in the case of the method according to the invention is characterized in that it is a strip which is elongate in a direction of main extention and the magnetic particles that are added to the thermoplastic resin are superparamagnetic particles. These and the preferred further features of the semifinished product according to the invention are explained in more detail above in connection with the method according to the invention.

Advantageous developments of the invention are provided by the patent claims, the description and the drawings. The advantages of features and combinations of multiple features that are mentioned in the introductory part of the description are merely given by way of example and may take effect alternatively or cumulatively, without the advantages necessarily having to be achieved by embodiments according to the invention. Further features can be taken from the drawings—in particular the geometries represented and the relative dimensions of multiple components with respect to one another and their relative arrangement and operative connection. The combination of features of different embodiments of the invention or features of different patent claims is likewise possible in ways other than that according to the chosen references of the patent claims to preceding claims, and is hereby suggested. This also applies to those features that are represented in separate drawings or are mentioned in the description thereof. These features may also be combined with features of different patent claims. Similarly, for other embodiments of the invention, features presented in the patent claims may be omitted.

Other features and advantages of the present invention will become apparent to one with skill in the art upon examination of the following drawings and the detailed description. It is intended that all such additional features and advantages be included herein within the scope of the present invention, as defined by the claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

DETAILED DESCRIPTION

Figure 1:
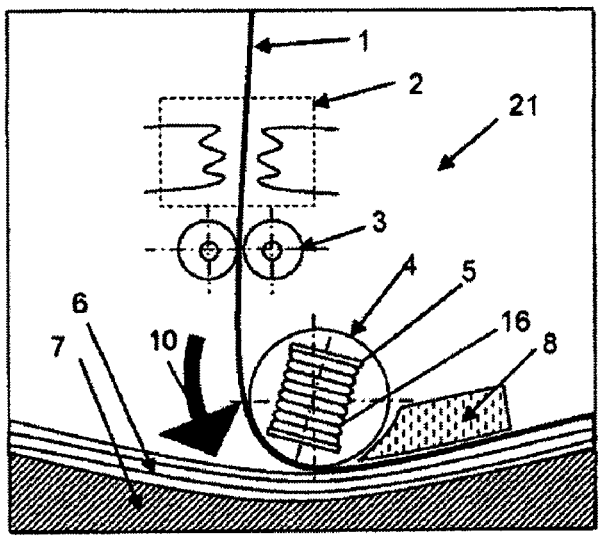
FIG. 1 shows the basic construction of a first embodiment of a tape layer in a schematic longitudinal section along the direction of advancement of processed starting material.

Referring now in greater detail to the drawings, FIG. 1 schematically depicts a tape layer serving the purpose of producing a molded article from a strip-shaped starting material 1. The starting material 1 comprises reinforcing fibers, running unidirectionally in a direction of advancement 10 of the starting material in the tape layer, and a thermoplastic resin. With the tape layer according to FIG. 1, the starting material 1 is applied in layers to a mold 7. In this case, only the first layer of the starting material 1 lies directly against the mold 7. The further layers of the starting material 1 are applied to the part 6 of the desired molded article that is already on the mold 7. In order thereby to form a permanent bond between the newly applied starting material 1 and the part 6, the starting material 1 is first initially heated in a preheating device 2, which is indicated here as comprising an electric heater. The heating of the starting material 1 to the joining temperature that is required to produce a permanent bond with the finished part 6 of the desired molded article is only brought about, however, after a roller guide 3 with a heating device 5, which is combined here with a laying roll 4 for the starting material 1. The heating device 5 actually comprises an induction coil 16, arranged inside the laying roll 4. An alternating current generator (not represented here) generates an alternating current through the induction coil 16. The resultant alternating magnetic field is introduced into the resin of the starting material 1. To encourage this introduction, and the resultant heating of the resin, superparamagnetic particles are added to the resin of the starting material 1. These particles allow the resin of the starting material 1 to heat up very quickly during the laying with the laying roll 4 to a high temperature adequate for the bond with the already existing part 6 of the desired molded article. This applies even if the resin of the starting material 1 is a thermoplastic resin that only melts at a high temperature above 250° C. After the region of the alternating magnetic field of the induction coil 16, the laid starting material 1 is pressed further with a cooling device 8, and thereby already cooled down again to below its melting temperature, in order to fix its bond with the lower-lying layers of the starting material.

Figure 2:
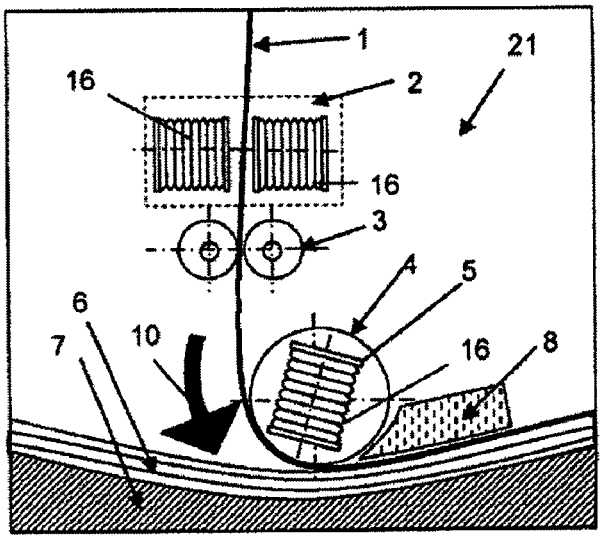
FIG. 2 shows a second embodiment of the tape layer in a schematic longitudinal section.

The embodiment of the tape layer according to FIG. 2 differs from that according to FIG. 1 in that here the preheating device 2 is also based on induction coils 16, with which an alternating magnetic field is generated in order to introduce it into the resin of the starting material 1 for heating the latter.

Figure 3:
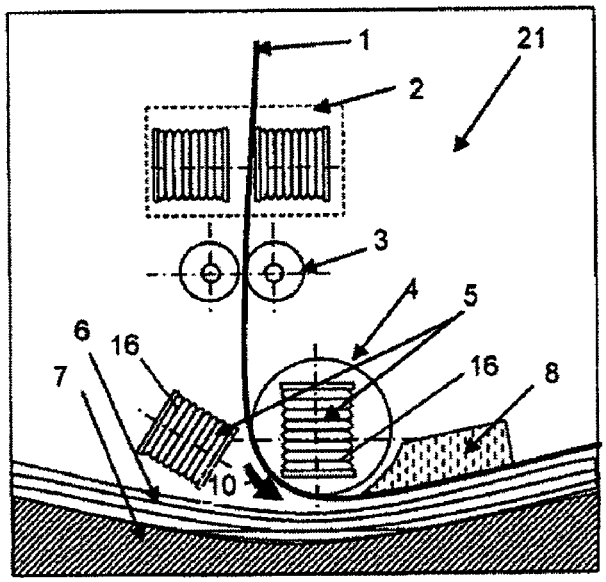
FIG. 3 shows a third embodiment of the tape layer in a schematic longitudinal section.

In the case of the embodiment of the tape layer according to FIG. 3, the heating device 5 is equipped with a further induction coil 16 outside the laying roll 4, which coil introduces an alternating magnetic field into the resin of the starting material 1 in the gap between the laying roll 4 and the already existing part 6 of the desired molded article where the starting material 1 runs in. For this purpose, the induction coil 16 inside the laying roll 4 is turned somewhat in the direction of advancement 10 with respect to those in FIGS. 1 and 2, so that the starting material 1 according to FIG. 3 is heated over a longer region, which extends into the joining region with the part 6 of the already existing molded article.

Figure 4:
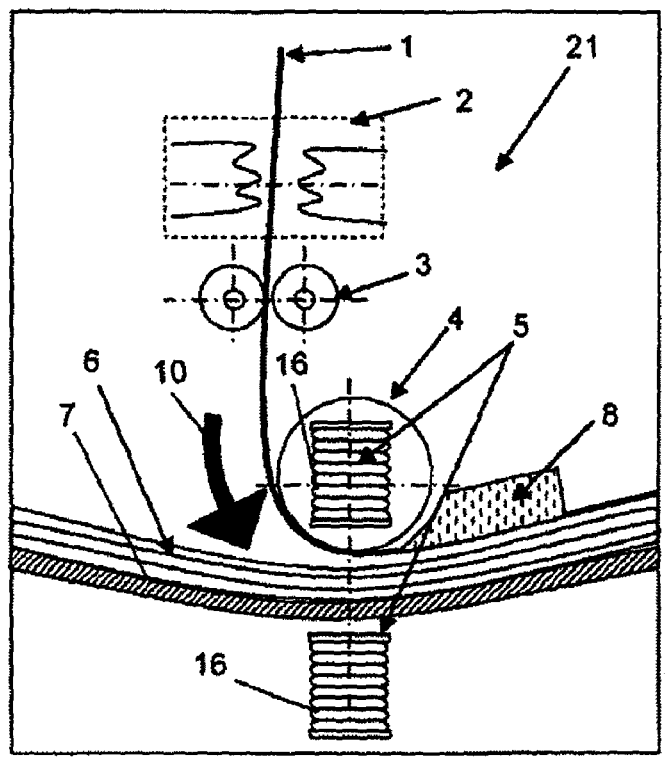
FIG. 4 shows a fourth embodiment of the tape layer in a schematic longitudinal section.

In the case of the tape layer diagrammatically shown in FIG. 4, a preheating device 2 with electric heating is again provided. Here, the heating device 5 comprises in addition to the induction coil 16 in the laying roll 4 a further induction coil 16 on the rear side of the mold 7. Such a paired arrangement of induction coils 16, as also obtained in the case of the preheating devices 2 according to FIGS. 2 and 3, makes it possible for the alternating magnetic field to be concentrated on a specific region. The arrangement according to FIG. 4 thereby also heats up the resin of the already laid layers of the starting material 1, which may be of advantage for intimate bonding with the newly laid starting material 1.

Figure 5:
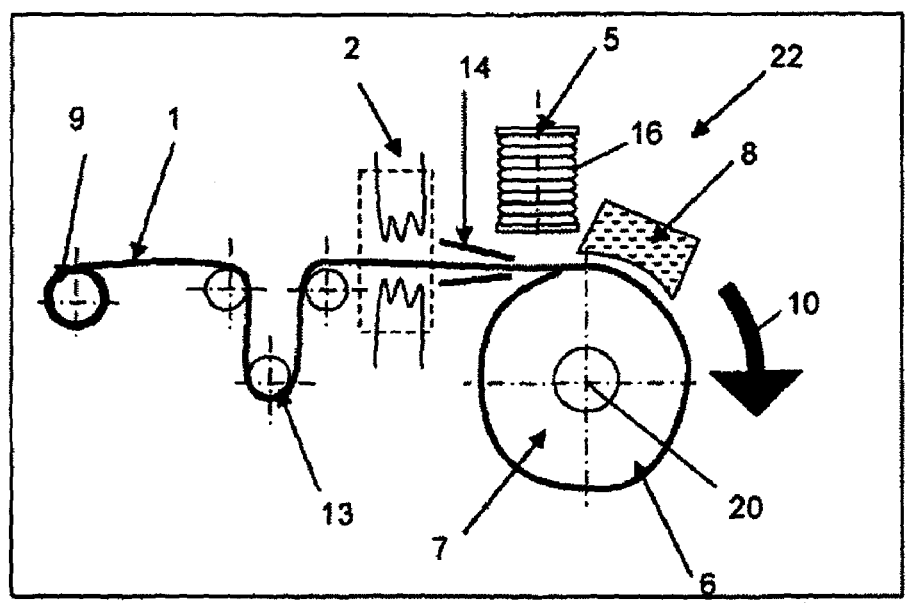
FIG. 5 shows a first embodiment of a tape winder in a schematic longitudinal section along the direction of advancement of processed starting material.

FIG. 5 shows the construction of a tape winder 22 as a further basic embodiment of the present invention. With the tape winder, strip-shaped starting material 1, again consisting of reinforcing fibers and thermoplastic resin, is wound onto a mold 7, which rotates about an axis 20 by means of a rotary drive (not represented here). The strip-shaped starting material 1 is wound onto the mold 4 in multiple layers, in order to form a tubular molded article from fiber composite material. The starting material is drawn from a supply roller 9 as a prepreg. Its tension is set with the aid of a spring-loaded dancer roller. It subsequently passes through a preheating device 2, which according to FIG. 5 is equipped with an electric heater. The starting material then passes through a so-called roving guide 14. After that, the starting material 1 enters the effective region of the heating device 5, which here comprises an induction coil 16 for introducing an alternating electromagnetic field into the resin of the starting material 1. The starting material wound up onto the mold 7, or the part 6 of the desired molded article already there, is cooled by a cooling device 8, which fixes the bond of the starting material, wound up in the plastic state, with the rest of the part 6 of the molded article.

Figure 6:
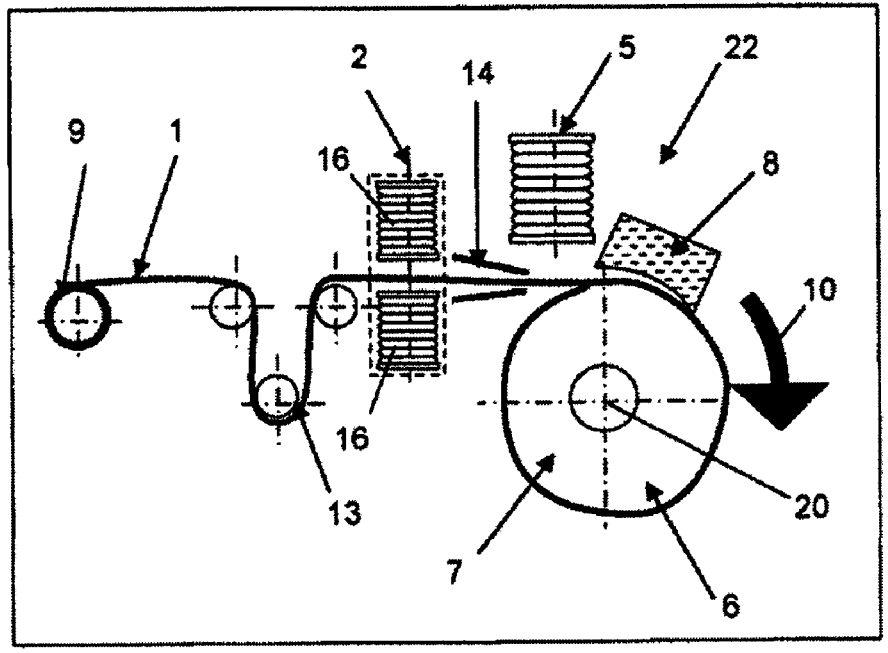
FIG. 6 shows a second embodiment of the tape winder in a schematic longitudinal section.
Figure 7:
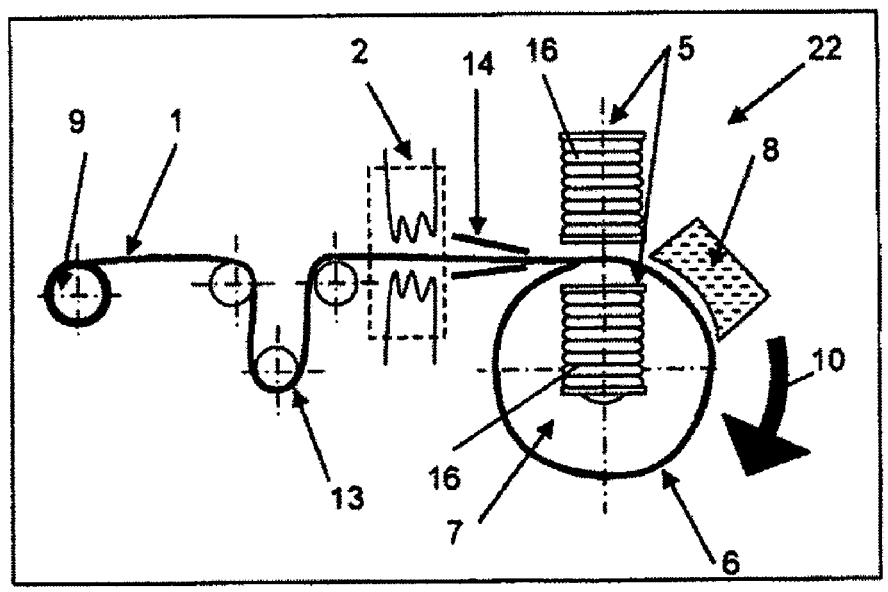
FIG. 7 shows a third embodiment of the tape winder in a schematic longitudinal section.

The embodiment of the tape winder 22 diagrammatically shown in FIG. 6 is varied in comparison with the embodiment according to FIG. 5 with respect to the formation of the preheating device 2. According to FIG. 6, the preheating device 2 comprises two induction coils 16 for generating an alternating magnetic field that is to be introduced into the resin of the starting material 1. In other words, according to FIG. 6 the entire heating of the starting material 1 takes place by introducing alternating magnetic fields into the resin. In the embodiment of the tape winder 22 that is shown in FIG. 7, the preheating device 2 again comprises an electric heater. Here, the heating device 5 is equipped in the region where the starting material 1 runs onto the mold 7 with two induction coils 16, which are arranged opposite each other over the starting material 1 and one of which is arranged inside the mold 7. This corresponds in principle to the embodiment of the tape layer according to FIG. 4.

Figure 8:
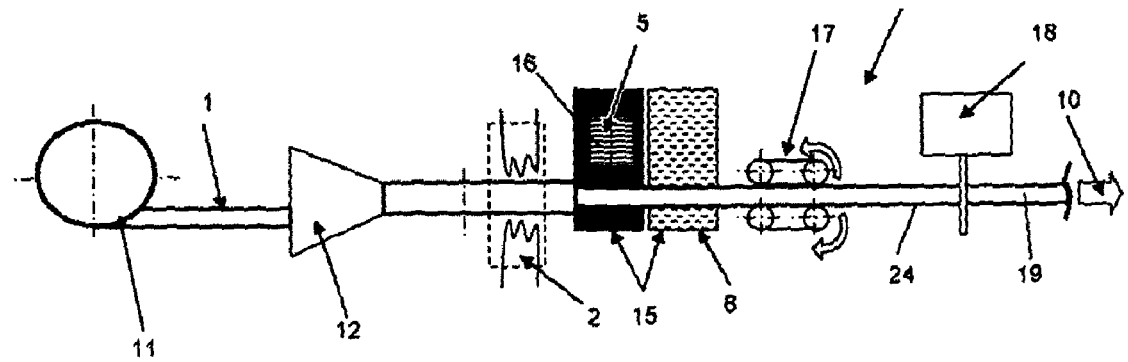
FIG. 8 shows a first embodiment of a pultruder in a schematic longitudinal section along the direction of advancement of processed starting material.

FIG. 8 shows the basic construction of a first embodiment of a pultruder 23, in which strip-shaped starting material 1 is molded into an endless profile 24 and cured. The endless profile 24 is divided up into profile portions 25 by a cutting tool 18. Here, too, the starting material 1 again comprises reinforcing fibers and a thermoplastic resin. It is drawn off from a raw material store 11, it being possible for different layers of the starting material 1 to be spatially combined. The starting material 1 then runs into a material guide 12, inside which it passes through the preheating device 2. The preheating device 2 is equipped here with an electric heater. After that, the starting material 1 enters a mold 15. In the front part of the mold 15, the heating device 5 is provided here with an induction coil 16. The rear part of the mold 15 is provided with a cooling device 8. Already emerging from the mold 15 is the endless profile 24, which is engaged by a pulling tool 17. The entire forward pull in the direction of advancement 10 is exerted on the starting material 1 by the pulling tool 17.

Figure 9:
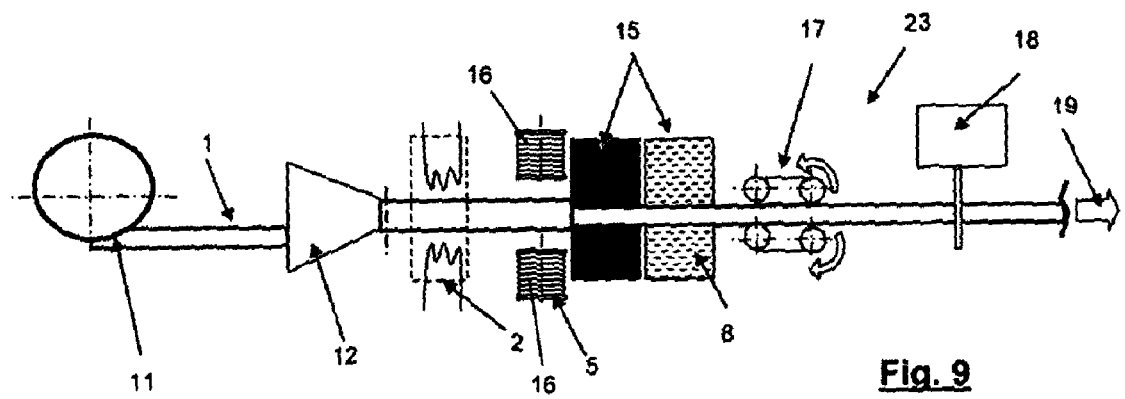
FIG. 9 shows a second embodiment of the pultruder in a schematic longitudinal section.

The embodiment of the pultruder 23 according to FIG. 9 differs from that according to FIG. 8 by a heating device 5, which is separate from the mold 15 and here has two induction coils 16 lying opposite each other over the material guide 12 or the starting material 1 running therein.

Figure 10:
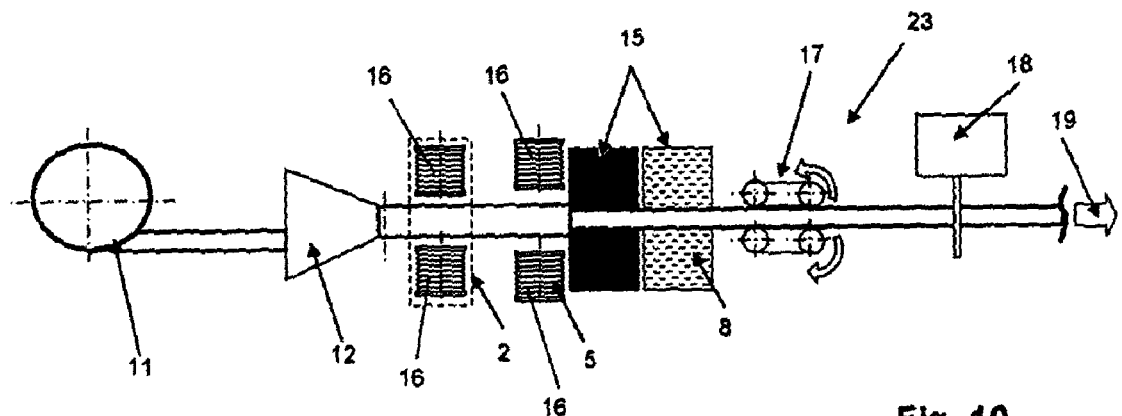
FIG. 10 shows a third embodiment of the pultruder in a schematic longitudinal section.

In the case of the pultruder 23 according to FIG. 10, the preheating device 2 is also additionally constructed on the basis of induction coils 16.

Figure 11:
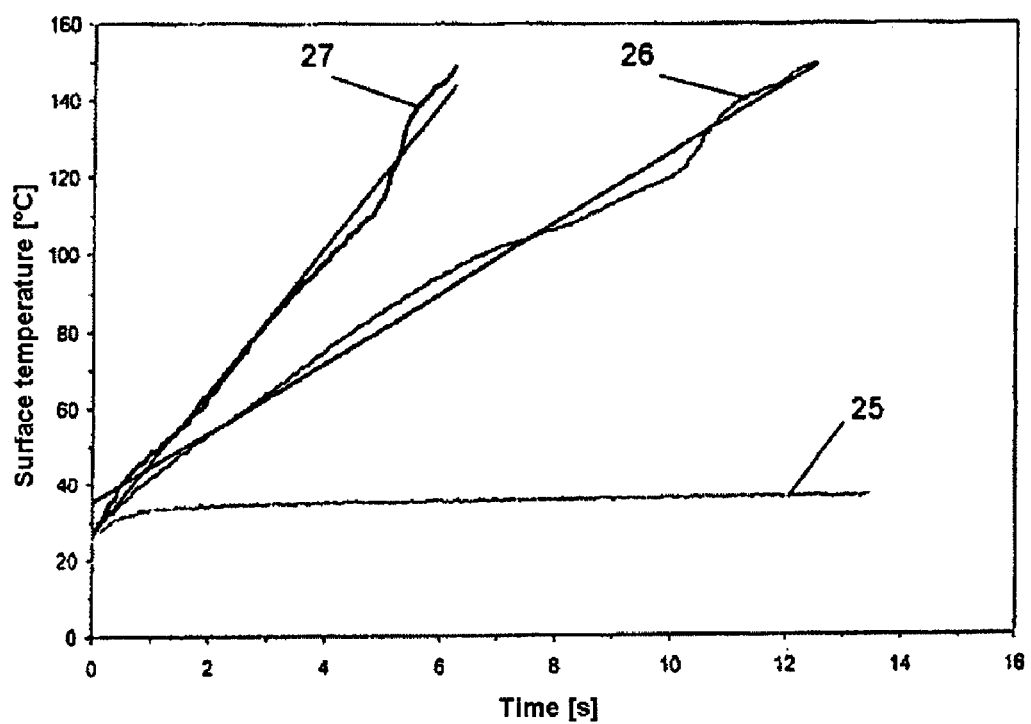
FIG. 11 shows a plot of heating-up curves for thermoplastic UD carbon prepregs partially enriched with magnetic nanoparticles as a function of the electrical power of a heating device which introduces a magnetic field into the resin of the UD carbon prepregs.

FIG. 11 shows with the heating-up curve 25 for a thermoplastic UD carbon prepreg without any addition of superparamagnetic particles to the resin that no appreciable heating can be achieved by introducing an alternating magnetic field even if a power of 5 kW is available for generating the alternating magnetic field. By contrast, the heating-up curves 26 and 27, which apply to the starting material 1 in which superparamagnetic particles have been added to the resin, demonstrate that effective coupling to the alternating magnetic field takes place in spite of the unidirectionally running carbon fibers, which as such are unsuitable for coupling to the alternating magnetic field even though they are in principle electrically conducting fibers. With the magnetic particles added to the resin, this coupling originally takes place by way of the resin, consequently precisely where the heat is required for melting the resin. The heating-up curve 27 is based on the same power of the alternating electromagnetic field as the heating-up curve 25. Its slope, i.e. the heating rate, is 19 kelvins per s. The heating-up curve 26, plotted for half the power of 2.5 kW, already corresponds to a heating rate of 9 kelvins per s. Therefore, in particular if it has been preheated, the resin of the starting material 1 can be melted very quickly with the aid of the introduced alternating magnetic field, as required for the subsequent processing of the starting material to produce the molded article as a fiber composite.

Resins Suitable for the Implementation of the Invention

Suitable resins are, for example, polyolefins such as polyethylene or polypropylene, polyamides, polyphenylene ether (PPE), polyamide/PPE blends, polycarbonate, polyesters such as polyarylate, polyethylene terephthalate or polybutylene terephthalate (PBT) or polycarbonate/PBT blends.

Primarily suited as polyamides are aliphatic or partly aromatic homocondensates and copolycondensates, for example PA 46, PA 66, PA 68, PA 610, PA 612, PA 614, PA 410, PA 810, PA 1010, PA 412, PA 1012, PA 1212, PA 6/6T, PA 66/6T, PA 6, PA 7, PA 8, PA 9, PA 10, PA 11 and PA 12. (The designation of the polyamides conforms to an international standard, wherein the first (n) digit(s) indicate(s) the number of C atoms of the starting diamine and the last (n) digit(s) indicate(s) the number of C atoms of the dicarboxylic acid. If only one number is given, this means that an α,ω-aminocarboxylic acid or the lactam derived therefrom has been taken as a basis. Otherwise, reference is made to H. Domininghaus, Die Kunststoffe und ihre Eigenschaften [Plastics and their properties], pages 272 et seq., VDI-Verlag, 1976.)

Particularly preferred are aromatic polymers, which contain recurring units of the formula

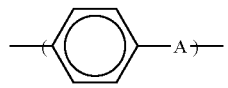

-A- being selected from the group —O—, —S— and

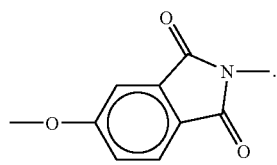

In addition, optionally recurring units of the formula

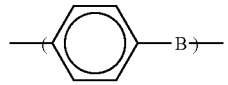

with —B—=—CO— or —SO$_2$— may be contained.

Examples of this are polyarylene ether ketones (PAEK), polysulfones, polyphenylene sulfide, polyimides, including polyether imide, and mixtures thereof or with other polymers.

Polyarylene ether ketones are prepared in a customary method of preparation by polycondensation. In the case of this so-called nucleophilic route, a suitable organic diol compound is reacted with a suitable organic dihalogen compound. The reaction is usually carried out in a solvent, such as for example diphenyl sulfone, using so-called auxiliary bases, which are present as solid constituents in the reaction mixture; a mixture of sodium carbonate and potassium carbonate in an approximately stoichiometric amount is usually used here. This method of preparation is described in many patent applications, for example in U.S. Pat. Nos. 4,320,224, 4,711,945 and 4,774,314, which are completely incorporated by reference. Aromatic difluoro compounds and bisphenols are usually used for the preparation of PAEK; for instance, in the preparation of polyether ether ketone (PEEK) according to the nucleophilic route, hydroquinone is used as the diol component and 4,4'-difluorobenzophenone is used as the dihalogen component.

The PAEK contains units of the formulae (—Ar—X—) and (—Ar'—Y—),

Ar and Ar' representing a bivalent aromatic radical, preferably 1,4-phenylene, 4,4'-biphenylene and 1,4-, 1,5- or 2,6-naphthylene. X is an electrophilic group, with preference carbonyl or sulfonyl, while Y represents another group such as O, S, CH$_2$, isopropylidene or the like. Here, at least 50%, with preference at least 70% and with particular preference at least 80%, of the groups X should represent a carbonyl group, while at least 50%, with preference at least 70% and with particular preference at least 80%, of the groups Y should consist of oxygen.

In the particularly preferred embodiment, 100% of the groups X consist of carbonyl groups and 100% of the groups Y consist of oxygen. In this embodiment, the PAEK may be, for example, a polyether ether ketone (PEEK; formula I), a polyether ketone (PEK; formula II), a polyether ketone ketone (PEKK; formula II) or a polyether ether ketone ketone (PEEKK; formula IV), but other arrangements of the carbonyl and oxygen groups are of course also possible.

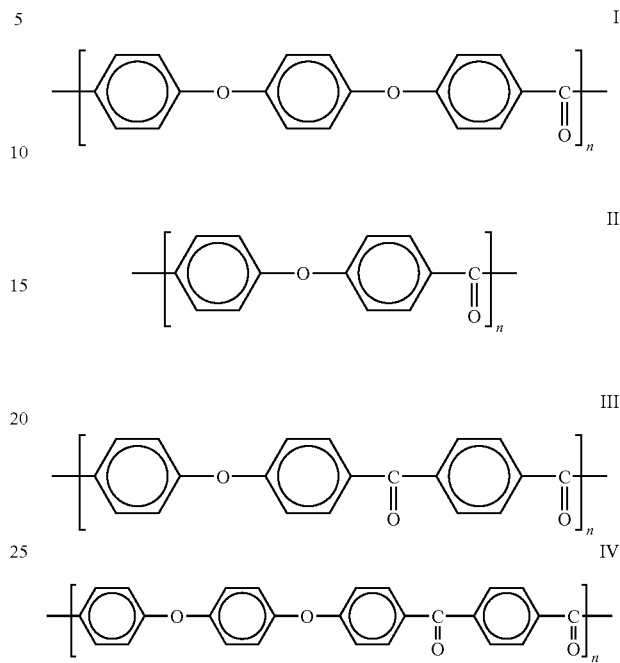

The PAEK is generally partially crystalline, which is expressed for example in the DSC analysis by finding a crystalline melting point $T_m$ that in terms of order of magnitude in most cases lies around 300° C. or above. However, the teaching of the invention is also applicable to amorphous PAEK. It is generally true that sulfonyl groups, biphenylene groups, naphthylene groups or bulky groups Y, such as for example an isopropylidene group, reduce the crystallinity.

Suitable polysulfones are generally prepared by polycondensation of a bisphenol/dihalogen diarylsulfone mixture in an aprotic solvent in the presence of a base, such as for example sodium carbonate. Preferably used as the bisphenol are bisphenol A, 4,4'-dihydroxydiphenyl sulfone, 4,4'-dihydroxydiphenyl or hydroquinone, it also being possible for mixtures of different bisphenols to be used. The dihalogen compound is in most cases 4,4'-dichlorodiphenyl sulfone; however, it is also possible to use any other dihalogen compound in which the halogen is activated by a sulfone group in the para position. Apart from chlorine, fluorine is also suitable as halogen. The term "polysulfone" also includes the polymers that are usually referred to as "polyether sulfone" or "polyphenylene sulfone". Suitable types are commercially available.

Polyphenylene sulfide is prepared from 1,4-dichlorobenzene and sodium sulfide in a high-boiling solvent. It is commercially available in many commercial grades.

Polyimides are prepared in a known way from tetracarboxylic acids or the anhydrides and diamines thereof. If the tetracarboxylic acid and/or the diamine contains an ether group, a polyether imide results. A particularly suitable ether-group-containing tetracarboxylic acid is the compound of the formula V; it is used together with aromatic diamines to obtain amorphous polyether imides, which are commercially available.

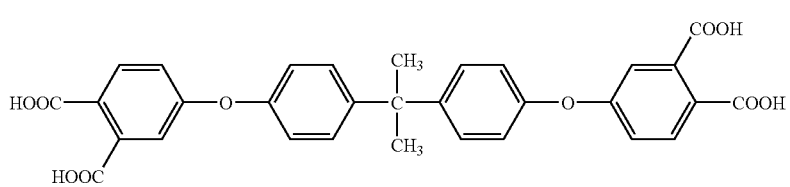

V

Superparamagnetic Particles Suitable for the Implementation of the Invention

Suitable superparamagnetic particles are described, for example, in U.S. Pat. No. 6,746,767 and in published US-Patent Application 2004/229,036 A1, which are both completely incorporated by reference.

In the case of the invention, the superparamagnetic particles in the resin are in the form of nanoscalar oxidic particles, which are preferably homogeneously distributed and, in particular, are not agglomerated. In particular, these particles are thermally stable in the resin and do not exhibit any agglomeration even at high temperatures. Furthermore, it is possible to control the rheology of the resin to the greatest extent independently of the content of such particles.

A number of primary particles may be aggregated in the superparamagnetic particles. Aggregated or aggregates is/are to be understood as meaning three-dimensional structures of grown primary particles. A number of aggregates can combine to form agglomerates. These agglomerates can easily be separated again, for instance by mechanical action, such as for example in the case of extrusion processes. By contrast to this, it is not generally possible for the aggregates to be broken down into the primary particles.

The aggregate diameter of the superparamagnetic particles is preferably greater than 100 nm and less than 1 µm. The aggregates of the superparamagnetic particles preferably have, at least in one spatial direction, a diameter of no more than 250 nm.

Domains are to be understood as meaning regions in a matrix that are spatially separate from one another. The domains of the superparamagnetic particles have a typical diameter of from 2 to 100 nm. The domains may also comprise non-magnetic regions, which however then do not make any contribution to the magnetic properties of the superparamagnetic particles.

In the superparamagnetic particles there may also additionally be magnetic domains, which on account of their size do not exhibit any superparamagnetism and induce remanence. This leads to an increase in the volume-specific saturation magnetization. According to the present invention, the superparamagnetic particles contain such a number of superparamagnetic domains that the resin to which they are added can be heated up to its curing or melting temperature by means of an alternating magnetic field.

The domains of the superparamagnetic particles may be completely or only partially enclosed by the surrounding matrix. Partially enclosed means that individual domains may protrude out of the surface of an aggregate. In any event, the superparamagnetic domains of the particles are non-agglomerated.

The magnetic domains may comprise one or more metal oxides. With preference, the magnetic domains contain oxides of iron, cobalt, nickel, chromium, europium, yttrium, samarium or gadolinium. In these domains, the metal oxides may be present in one and the same modification or in different modifications. A particularly preferred magnetic domain is iron oxide in the form of gamma-$Fe_2O_3$ ($\gamma$-$Fe_2O_3$), $Fe_3O_4$, mixtures of gamma-$Fe_2O_3$ ($\gamma$-$Fe_2O_3$) and/or $Fe_3O_4$.

The magnetic domains may also be present as a mixed oxide of at least two metals with the metal components iron, cobalt, nickel, tin, zinc, cadmium, magnesium, manganese, copper, barium, magnesium, lithium or yttrium.

The magnetic domains may also be substances with the general formula $M^{II}Fe_2O_4$, in which $M^{II}$ stands for a metal component which comprises at least two bivalent metals that are different from each other. With preference, one of the bivalent metals may be manganese, zinc, magnesium, cobalt, copper, cadmium or nickel.

Furthermore, the magnetic domains may be made up from ternary systems of the general formula $(M^1_{1-x-y}M^b_x Fe_y)^{II}Fe_2^{III}O_4$, in which $M^a$, or $M^b$, may be the metals manganese, cobalt, nickel, zinc, copper, magnesium, barium, yttrium, tin, lithium, cadmium, magnesium, calcium, strontium, titanium, chromium, vanadium, niobium, molybdenum, with x=0.05 to 0.95, y=0 to 0.95 and x+y$\leq$1.

Particularly preferred may be $ZnFe_2O_4$, $MnFe_2O_4$, $Mn_{0.6}Fe_{0.4}Fe_2O_4$, $Mn_{0.5}Zn_{0.5}Fe_2O_4$, $Zn_{0.1}Fe_{1.9}O_4$, $Zn_{0.2}Fe_{1.8}O_4$, $Zn_{0.3}Fe_{1.7}O_4$, $Zn_{0.4}Fe_{1.6}O_4$ or $Mn_{0.39}Zn_{0.27}Fe_{2.34}O_4$, $MgFe_2O_3$, $Mg_{1.2}Mn_{0.2}Fe_{1.6}O_4$, $Mg_{1.4}Mn_{0.4}Fe_{1.2}O_4$, $Mg_{1.6}Mn_{0.6}Fe_{0.8}O_4$, $Mg_{1.8}Mn_{0.8}Fe_{0.4}O_4$.

The choice of the metal oxide of the non-magnetic matrix is not restricted any further. With preference, these oxides may be of titanium, zirconium, zinc, aluminum, silicon, cerium or tin.

For the purposes of the invention, the metal oxides also include metalloid oxides, such as for example silicon dioxide.

Furthermore, the matrix and/or the domains may be amorphous and/or crystalline.

Many variations and modifications may be made to the preferred embodiments of the invention without departing substantially from the spirit and principles of the invention. All such modifications and variations are intended to be included herein within the scope of the present invention, as defined by the following claims.

| LIST OF REFERENCE NUMERALS | |
|---|---|
| 1 | starting material |
| 2 | preheating device |
| 3 | roller guide |
| 4 | laying roll |
| 5 | heating device |
| 6 | part of the molded article to be produced |
| 7 | mold |
| 8 | cooling device |
| 9 | supply roller |
| 10 | direction of advancement |
| 11 | raw material store |
| 12 | material guide |
| 13 | dancer roller |
| 14 | roving guide |
| 15 | mold |

-continued

LIST OF REFERENCE NUMERALS

| | |
|---|---|
| 16 | induction coil |
| 17 | pulling tool |
| 18 | cutting tool |
| 19 | profile portion |
| 20 | axis |
| 21 | tape layer |
| 22 | tape winder |
| 23 | pultruder |
| 24 | endless profile |
| 25 | heating-up curve |
| 26 | heating-up curve |
| 27 | heating-up curve |

We claim:

1. A production method for producing molded articles from fiber composites, the method comprising the steps of:
    selecting superparamagnetic particles from a group of superparamagnetic particles becoming coupled to an external alternating magnetic field;
    adding the selected superparamagnetic particles to a resin portion of a strip-shaped starting material comprising the resin portion and reinforcing fibers;
    continuously advancing the strip-shaped starting material;
    heating the continuously advanced strip-shaped starting material by coupling-in an external alternating magnetic field, to which the superparamagnetic particles in the resin portion of the starting material become coupled;
    continuously molding the heated starting material into a molded article; and
    curing the resin portion in the molded article.

2. The production method of claim 1, wherein the superparamagnetic particles are added to the resin portion of the starting material at a ratio in a range from 0.1 to 50% by weight of the resin portion.

3. The production method of claim 2, wherein the superparamagnetic particles are selected from a group of superparamagnetic particles comprising primary particles of single magnetic metal-oxide domains having a diameter in a range from 2 to 100 nm.

4. The production method of claim 3, wherein the superparamagnetic particles are selected from a group of superparamagnetic particles comprising primary particles embedded in a non-magnetic matrix.

5. The production method of claim 4, wherein the superparamagnetic particles are selected from a group of superparamagnetic particles comprising primary particles embedded in a non-magnetic matrix selected from metal-oxide and metalloid-oxide matrices.

6. The production method of claim 1, wherein the reinforcing fibers run unidirectionally in a direction in which the starting material is continuously advanced.

7. The production method of claim 6, wherein the starting material is continuously advanced by pulling.

8. The production method of claim 1, wherein the starting material is continuously advanced by pushing.

9. The production method of claim 1, wherein the alternating magnetic field is coupled-in at a frequency in a range from 10 kHz to 60 MHz.

10. The production method of claim 9, wherein the alternating magnetic field is coupled-in at a frequency in a range from 100 kHz to 10 MHz.

11. The production method of claim 10, wherein the alternating magnetic field is coupled-in at a frequency in a range from 100 kHz to 1 MHz.

12. The production method of claim 1, and comprising the further step of cooling the starting material molded into the molded article.

13. The production method of claim 1, wherein the starting material is molded into the molded article in a pultrusion process.

14. The production method of claim 13, wherein the alternating magnetic field is coupled into the starting material upstream of a mold.

15. The production method of claim 1, wherein the starting material is molded onto an already existing part of the molded article in a tape laying process.

16. The production method of claim 15, wherein the alternating magnetic field is coupled into the starting material in a region between guide rollers and a cooled pressing tool for the starting material.

17. The production method of claim 1, wherein the starting material is wound onto an already existing part of the molded article in a winding process.

18. The production method of claim 17, wherein the alternating magnetic field is coupled into the starting material in a region between a roving guide and a cooled pressing tool for the starting material.

19. The production method of claim 1, wherein a resin of the resin portion of the starting material is a thermoplastic resin.

20. The production method of claim 19, wherein the thermoplastic resin is a high-temperature thermoplastic.

21. The production method of claim 20, wherein the high-temperature thermoplastic is selected from the group of high-temperature thermoplastics that comprises polyether ketones and polyphenylene sulfides.

22. The production method of claim 1, wherein a resin of the resin portion of the starting material is a thermoset resin.

23. A production method for producing molded articles from fiber composites, the method comprising the steps of:
    selecting superparamagnetic particles from a group of superparamagnetic particles which comprise primary particles of single magnetic metal-oxide domains having a diameter in a range from 2 to 100 nm embedded in a non-magnetic matrix, and which become coupled to an external alternating magnetic field;
    adding the selected superparamagnetic particles to a resin portion of a strip-shaped starting material comprising the resin portion and reinforcing fibers at a ratio in a range from 0.1 to 50% by weight of the resin portion, wherein the resin portion consists of a high-temperature thermoplastic;
    continuously advancing the strip-shaped starting material;
    heating the continuously advanced strip-shaped starting material by coupling-in an external alternating magnetic field at a frequency in a range from 10 kHz to 60 MHz, to which the superparamagnetic particles in the resin portion of the starting material become coupled;
    continuously molding the heated starting material into a molded article; and
    cooling the starting material molded into the molded article to solidify the resin portion in the molded article.

24. A semifinished product for use in producing molded articles from fiber composites, the product being a strip which is elongate in a direction of main extention and comprising reinforcing fibers and a resin portion which includes superparamagnetic particles, wherein the superparamagnetic particles are included in the resin portion in an amount of from 0.1 to 50% by weight, and the superparamagnetic particles comprise primary particles of single magnetic metal-oxide domains having a diameter in a range from 2 to 100 nm.

25. The semifinished product of claim 24, wherein the primary particles of single magnetic metal-oxide domains of the superparamagnetic particles are covered with a layer of a non-magnetic matrix.

26. The semifinished product of claim 25, wherein the non-magnetic matrix is selected from the group consisting of a metal-oxide matrix and a metalloid-oxide matrix.

27. The semifinished product of claim 26, wherein the non-magnetic matrix is the metal-oxide matrix and the metal-oxide of the metal-oxide matrix is selected from the group consisting of oxides of titanium, zirconium, zinc, aluminum, silicon, cerium and tin.

28. The semifinished product of claim 26, wherein the non-magnetic matrix is the metalloid-oxide matrix and the metalloid-oxide of the metalloid-oxide matrix is silicon dioxide.

29. The semifinished product of claim 24, wherein the reinforcing fibers run unidirectionally in the direction of main extention of the elongate strip.

30. The semifinished product of claim 24, wherein the resin portion comprises a thermoplastic resin.

31. The semifinished product of claim 24, wherein the resin portion comprises a thermoset resin.

32. The semifinished product of claim 30, wherein the thermoplastic resin is a high-temperature thermoplastic.

33. The semifinished product of claim 32, wherein the high-temperature thermoplastic is selected from the group of high-temperature thermoplastics that comprises polyether ketones and polyphenylene sulfides.

34. The semifinished product of claim 24, wherein the primary particles of single magnetic metal-oxide domains have a diameter in a range from 2 nm to less than 50 nm.

35. The semifinished product of claim 24, wherein the reinforcing fibers are carbon fibers.

* * * * *